(12) United States Patent
Ikeda

(10) Patent No.: US 10,583,501 B2
(45) Date of Patent: Mar. 10, 2020

(54) INSERT, CUTTING TOOL, AND METHOD FOR MANUFACTURING CUTTING WORKPIECE

(71) Applicant: KYOCERA CORPORATION, Kyoto-shi, Kyoto (JP)

(72) Inventor: Yoshihito Ikeda, Ritto (JP)

(73) Assignee: Kyocera Corporation, Kyoto-shi, Kyoto (JP)

( * ) Notice: Subject to any disclaimer, the term of this patent is extended or adjusted under 35 U.S.C. 154(b) by 31 days.

(21) Appl. No.: 16/075,188

(22) PCT Filed: Feb. 6, 2017

(86) PCT No.: PCT/JP2017/004224
§ 371 (c)(1),
(2) Date: Aug. 3, 2018

(87) PCT Pub. No.: WO2017/135469
PCT Pub. Date: Aug. 10, 2017

(65) Prior Publication Data
US 2019/0039152 A1 Feb. 7, 2019

(30) Foreign Application Priority Data

Feb. 5, 2016 (JP) .................................. 2016-020429

(51) Int. Cl.
*B23B 27/14* (2006.01)
*B23C 5/06* (2006.01)
*B23B 27/00* (2006.01)

(52) U.S. Cl.
CPC .............. *B23C 5/06* (2013.01); *B23B 27/007* (2013.01); *B23B 27/143* (2013.01); *B23C 2200/0455* (2013.01)

(58) Field of Classification Search
CPC . B23B 27/007; B23B 27/143; B23B 27/1607; B23B 27/1618; B23B 27/141;
(Continued)

(56) References Cited

U.S. PATENT DOCUMENTS 5,193,947 A 3/1993 Bernadic et al.
5,456,557 A * 10/1995 Bernadic ............... B23B 27/143
407/114

(Continued)

FOREIGN PATENT DOCUMENTS

JP         S6120204 U   2/1986
JP         H05104310 A  4/1993
(Continued)

*Primary Examiner* — Sara Addisu
(74) *Attorney, Agent, or Firm* — Viering, Jentschura & Partner MBB

(57) ABSTRACT

An insert includes an upper surface including at least one corner part and a plurality of side parts, and a side surface. The upper surface includes a corner region. The corner region includes a first corner surface, a second corner surface, a third corner surface, and a fourth corner surface which are located sequentially in order from a side of the corner part. The first corner surface is inclined downward. The second corner surface, the third corner surface and the fourth corner surface are inclined upward. An inclination angle $\theta 12$ of the second corner surface is greater than an inclination angle $\theta 13$ of the third corner surface. An inclination angle $\theta 14$ of the fourth corner surface is greater than the inclination angle $\theta 12$ of the second corner surface.

17 Claims, 15 Drawing Sheets

(58) Field of Classification Search
CPC . B23B 27/1614; B23B 27/22; B23B 2200/20; B23B 2200/201; B23B 2200/08; B23C 2200/0455; B23C 5/06
See application file for complete search history.

(56) References Cited

U.S. PATENT DOCUMENTS

| | | | | |
|---|---|---|---|---|
| 5,771,763 | A * | 6/1998 | Naslund | B23B 27/145 407/113 |
| 7,008,148 | B2 * | 3/2006 | Wiman | B23B 27/141 407/113 |
| 7,976,251 | B2 * | 7/2011 | Iyori | B23B 27/143 407/113 |
| 9,849,514 | B2 * | 12/2017 | Sakai | B23B 27/143 |
| 2002/0127068 | A1 * | 9/2002 | Kinukawa | B23B 27/145 407/113 |
| 2003/0086767 | A1 * | 5/2003 | Wiman | B23B 27/141 407/114 |
| 2006/0188347 | A1 * | 8/2006 | Kratz | B23B 27/145 407/113 |
| 2006/0228179 | A1 * | 10/2006 | Alm | B23B 27/145 407/113 |
| 2011/0142555 | A1 * | 6/2011 | Yamazaki | B23B 27/143 407/2 |
| 2011/0229279 | A1 * | 9/2011 | Kobayashi | B23B 27/143 407/115 |
| 2012/0170987 | A1 | 7/2012 | Komatsuka | |
| 2012/0177452 | A1 * | 7/2012 | Konta | B23B 27/141 407/114 |
| 2012/0198973 | A1 * | 8/2012 | Schleinkofer | B23B 27/143 82/117 |
| 2013/0064613 | A1 * | 3/2013 | Krishtul | B23B 27/143 407/114 |
| 2014/0286717 | A1 * | 9/2014 | Lof | B23B 27/143 407/114 |
| 2014/0286718 | A1 * | 9/2014 | Scherman | B23B 27/143 407/114 |
| 2016/0082518 | A1 | 3/2016 | Sakai | |
| 2016/0243624 | A1 * | 8/2016 | Tomoda | B23B 27/143 |
| 2016/0361767 | A1 * | 12/2016 | Ikeda | B23B 27/141 |

FOREIGN PATENT DOCUMENTS

| | | | | |
|---|---|---|---|---|
| JP | 2012121132 A * | 6/2012 | | B23B 27/1607 |
| JP | 5187447 B2 | 4/2013 | | |
| WO | 2014192798 A1 | 12/2014 | | |

* cited by examiner

INSERT, CUTTING TOOL, AND METHOD FOR MANUFACTURING CUTTING WORKPIECE

CROSS-REFERENCE TO RELATED APPLICATIONS

This application is a national stage entry according to 35 U.S.C. 371 of PCT Application No. PCT/JP2017/004224 filed on Feb. 6, 2017, which claims priority to Japanese Application No. 2016-020429 filed on Feb. 5, 2016, which are entirely incorporated herein by reference.

TECHNICAL FIELD

The present non-limiting aspect of the disclosure relates to an insert, a cutting tool, and a method of manufacturing a machined product.

BACKGROUND

An insert described in Patent Document 1 is used for a cutting process. The insert described in Patent Document 1 has, on an upper surface thereof, an island having a chip crushing inclined surface (a first inclined surface) disposed therearound, a pad (chip flow deceleration pad) that connects to the first inclined surface at a corner portion of the island, and a chip flow deceleration inclined surface (second inclined surface) located around the pad. When a cutting process is carried out using the insert described in Patent Document 1, chips can be pushed up at the second inclined surface onto the pad and then pushed up at the pad onto the first inclined surface.

The insert described in Patent Document 1 is capable of suitably carrying out a cutting process at a high feed rate and a large depth of cut. Meanwhile, there is a need for an insert suitably usable in a cutting process at a small depth of cut as in the case of using only corner parts of an upper surface as a cutting edge. In other words, there is a need for an insert capable of suitably cutting a workpiece in both a cutting process at a low feed rate and a cutting process at a high feed rate in the case of a small depth of cut.

Patent Document 1: Japanese Unexamined Patent Publication No. 5-104310

SUMMARY

An insert in a non-limiting aspect of the disclosure includes an upper surface including at least one corner part and a plurality of side parts, and a side surface adjacent to the upper surface. The upper surface includes a corner region extending from the corner part toward a middle part on the upper surface. The corner region includes a first corner surface, a second corner surface, a third corner surface, and a fourth corner surface which are located sequentially in order from a side of the corner part. The first corner surface is inclined downward as going away from the corner part. The second corner surface is inclined upward as going away from the first corner surface. The third corner surface is inclined upward as going away from the second corner surface. The fourth corner surface is inclined upward as going away from the third corner surface. An inclination angle θ12 of the second corner surface is greater than an inclination angle θ13 of the third corner surface. An inclination angle θ14 of the fourth corner surface is greater than the inclination angle θ12 of the second corner surface.

DETAILED DESCRIPTION

Figure 1:
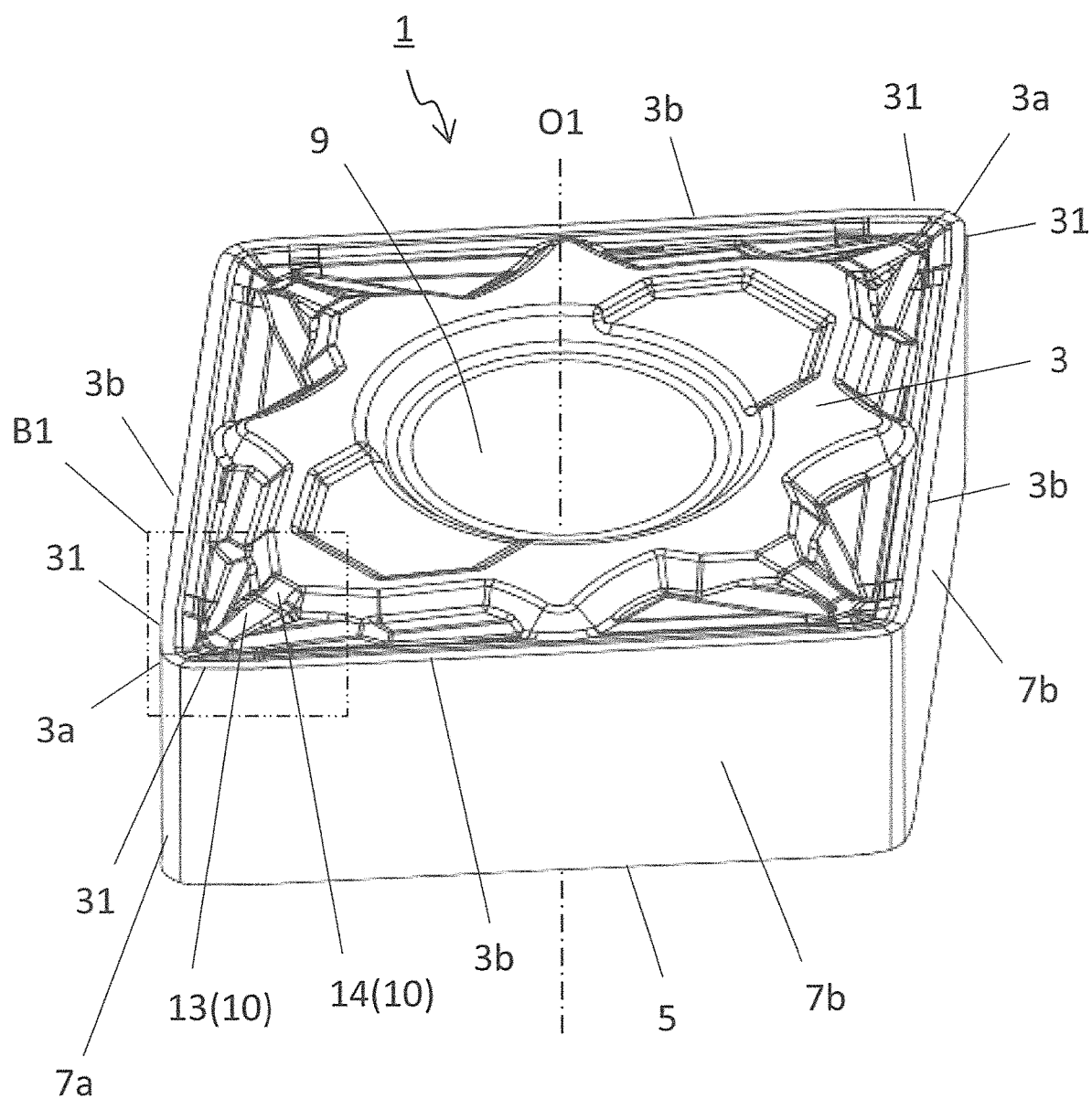
FIG. 1 is a perspective view illustrating an insert.

A cutting insert (hereinafter also referred to as "insert") in a non-limiting aspect of the present disclosure and a cutting tool including the insert are described in detail below with reference to the drawings. For the sake of description, the drawings referred to in the following illustrate, in a simplified form, only main members necessary for describing the aspects of the disclosure. The insert and the cutting tool in the present disclosure are therefore capable of including any arbitrary structural member not illustrated in the drawings referred to. Sizes of the members in each of the drawings do not faithfully represent sizes of actual structural members and size ratios of these members. These points are also true for a method of manufacturing a machined product described later.

<Insert>

Firstly, the insert 1 in a non-limiting aspect of the disclosure is described with reference to the drawings. The insert 1 of the present non-limiting aspect of the disclosure is suitably usable as an insert in a cutting edge replaceable turning tool used in, for example, an external turning process.

Figure 2:
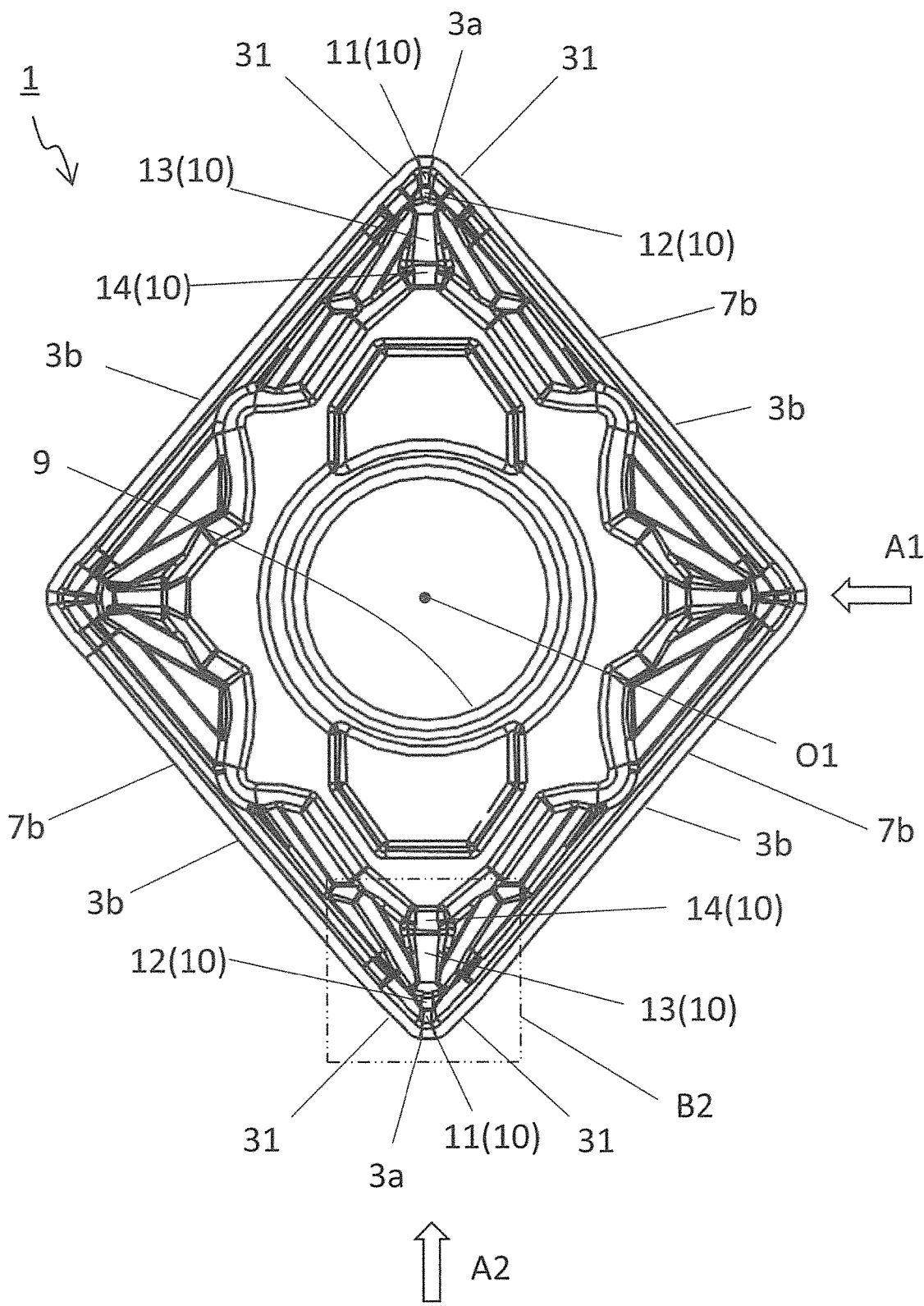
FIG. 2 is a top view of the insert illustrated in FIG. 1.

The insert 1 of the present non-limiting aspect of the disclosure includes an upper surface 3, a lower surface 5, and a side surface 7 as illustrated in FIG. 1 and the like. The upper surface 3 is a surface, at least part of which functions as a rake surface. As illustrated in FIG. 2, the upper surface 3 has an approximately polygonal shape and has at least one corner part 3a and a plurality of side parts 3b. The upper surface 3 has an approximately quadrangular shape, and has four corner parts and four side parts in the present non-limiting aspect of the disclosure. The four corner parts are made up of two corner parts each having an acute angle and two corner parts each having an obtuse angle. In FIGS. 1 to 4, the two corner parts having the acute angle are "corner parts 3*a*," and the side parts respectively extending from these corner parts 3*a* are "side parts 3*b*."

As illustrated in FIG. 2 and the like, the corner parts 3*a* on the upper surface 3 in the present non-limiting aspect of the disclosure are not strict corners but have a rounded shape. The side parts 3*b* on the upper surface 3 are not strictly limited to a straight line shape but may include a region having a curvilinear shape.

Figure 3:
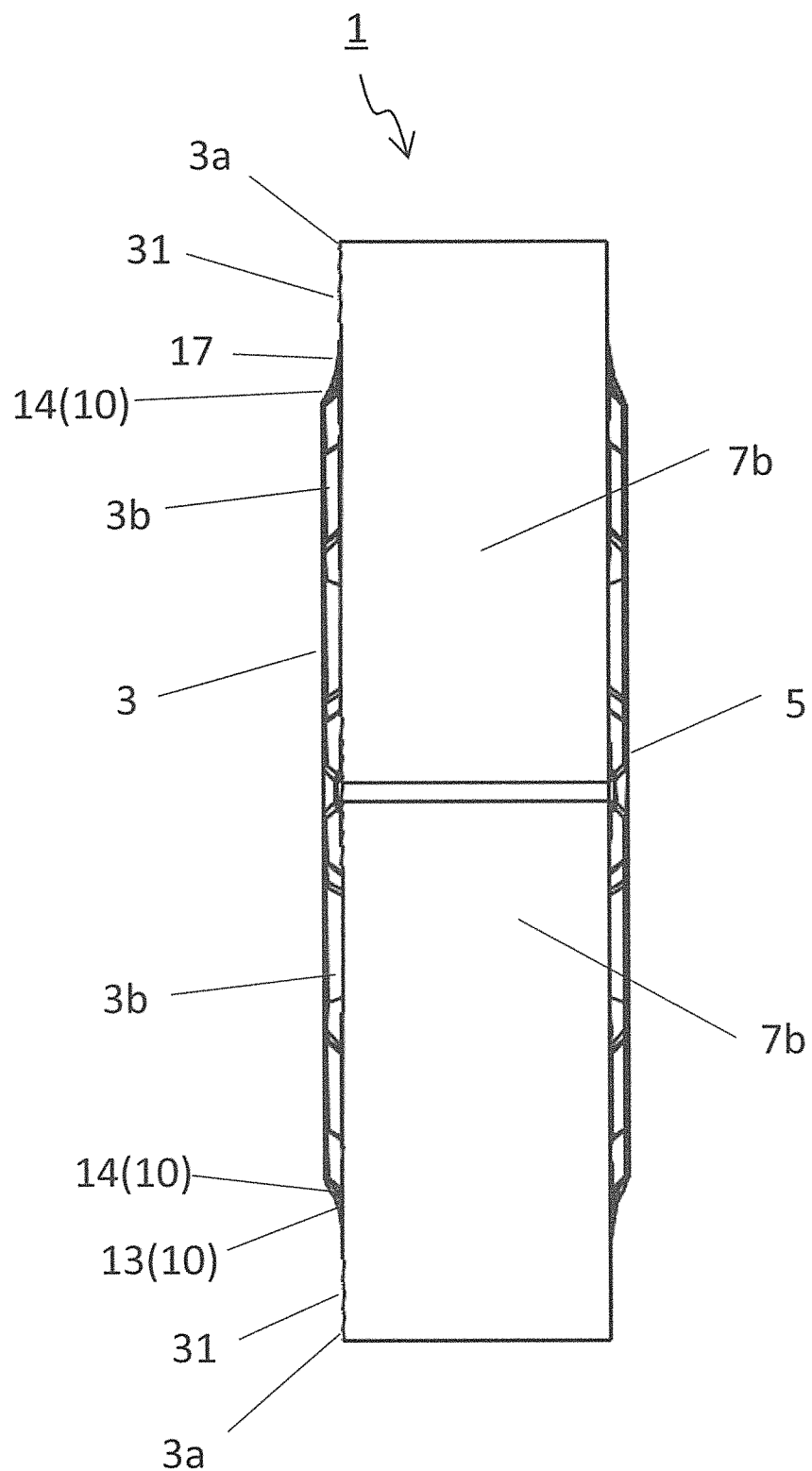
FIG. 3 is a side view as viewed from A1 direction in the insert illustrated in FIG. 2.
Figure 4:
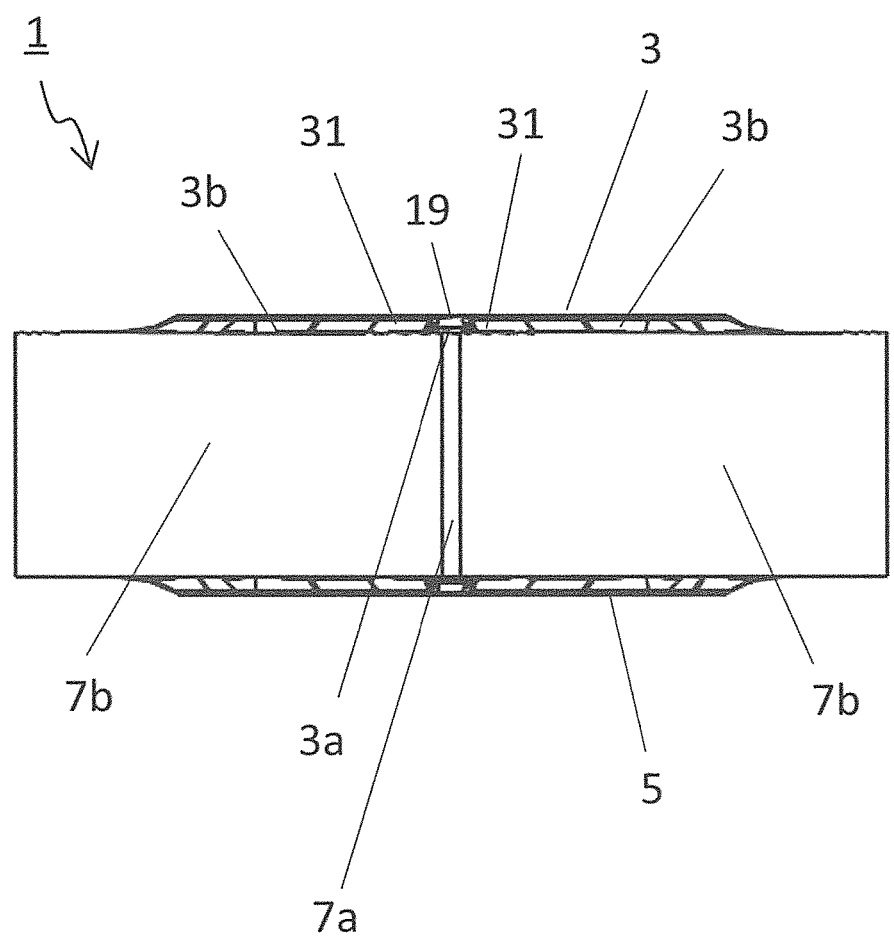
FIG. 4 is a side view as viewed from A2 direction in the insert illustrated in FIG. 2.

The lower surface 5 is a surface which is located on a side opposite to the upper surface 3, and which functions as a seating surface with respect to a pocket when attaching the insert 1 of the present non-limiting aspect of the disclosure to a holder. Similarly to the upper surface 3, the lower surface 5 in the present non-limiting aspect of the disclosure has an approximately polygonal shape, specifically, an approximately quadrangular shape. The lower surface 5 in the present non-limiting aspect of the disclosure has the same shape as the upper surface 3. The upper surface 3 is overlapped with the lower surface 5 in a top view. Therefore, the side surface 7 is orthogonal to the upper surface 3 and the lower surface 5 as illustrated in FIGS. 3 and 4. Alternatively, the lower surface 5 may be made somewhat smaller than the upper surface 3. In this case, the lower surface 5 is made in a similar shape to the upper surface 3, and the side surface 7 is inclined toward a central axis O1 described later as going away from the upper surface 3.

The shapes of the upper surface 3 and the lower surface 5 are not limited to the above embodiments. Although the upper surface 3 has the approximately quadrangular shape in the insert 1 of the present non-limiting aspect of the disclosure in the top view, the upper surface 3 may have, for example, a polygonal shape in the top view, such as a triangular shape, a pentagonal shape, and a hexagonal shape. In cases where the upper surface 3 has a quadrangular shape, the upper surface 3 may have a rectangular shape, a parallelogram shape, a rhombus shape, or a square shape.

The side surface 7 is a surface, at least part of which functions as a flank surface. The side surface 7 is adjacent to the upper surface 3. As illustrated in FIGS. 3 and 4, the side surface 7 in the present non-limiting aspect of the disclosure is located between the upper surface 3 and the lower surface 5, and connects to each of the upper surface 3 and the lower surface 5. The side parts 3*b* correspond to a ridge between the upper surface 3 and the side surface 7. The side surface 7 in the insert 1 illustrated in FIG. 1 includes four flat regions 7*b* and four curved surfaces 7*a* respectively located between flat regions (below the corner parts 3*a*).

For example, cemented carbide or cermet is usable as a material of the insert 1. Examples of compositions of the cemented carbide include WC—Co, WC—TiC—Co, and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) or titanium nitride (TiN).

A surface of the insert 1 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN), and alumina ($Al_2O_3$).

The insert 1 includes a through hole 9 as illustrated in FIGS. 1 and 2. The through hole 9 penetrates between a center of the upper surface 3 and a center of the lower surface 5. The through hole 9 is provided for the purpose of fixing the insert 1 to the holder of the cutting tool. Specifically, the through hole 9 is provided for inserting a screw therein when screwing the insert 1 into the holder of the cutting tool. A method of fixing the insert 1 to the holder is not limited to the screwing as described above. For example, the through hole 9 is also usable when the insert 1 is fixed to the holder by a clamper or lever. In this case, the through hole 9 need not reach the lower surface 5.

The central axis O1 of the through hole 9 coincides with an imaginary straight line passing through the center of the upper surface 3 and the center of the lower surface 5. A direction of the central axis O1 of the through hole 9, in other words, a penetrating direction of the through hole 9 is orthogonal to the upper surface 3 and the lower surface 5.

The through hole 9 is not limited to one which is located continuously from the center of the upper surface 3 to the center of the lower surface 5. For example, the through hole 9 may be located between flat regions 7*b* on the side surface 7 which are located oppositely to each other.

A maximum width of the upper surface 3 in a top view is, for example, 6-25 mm in the insert 1 of the present non-limiting aspect of the disclosure. Here, the maximum width of the upper surface 3 in the top view denotes a distance between the corner parts 3*a* in FIG. 2. A height between the lower surface 5 and the upper surface 3 is, for example, 1-10 mm. The height between the lower surface 5 and the upper surface 3 denotes a length in a direction parallel to the central axis O1 in between an upper end of the upper surface 3 and a lower end of the lower surface 5.

At least a part of the ridge, at which the upper surface 3 intersects with the side surface 7, is usable as a cutting edge 31 in a cutting process of a workpiece. In other words, the cutting edge 31 corresponds to the corner part 3*a* and at least a part of the side part 3*b* that connects to the corner part 3*a*. Alternatively, the entirety of the side part 3*b* may be used as the cutting edge 31.

The cutting edge 31, namely, the ridge at which the upper surface 3 intersects with the side surface 7 need not be sharply pointed. Cutting performance can be enhanced when the cutting edge 31 is sharply pointed. Alternatively, the cutting edge 31 (the ridge at which the upper surface 3 intersects with the side surface 7) may have a slightly curved surface shape. Durability of the cutting edge 31 can be enhanced when the cutting edge 31 has the curved surface shape. The curved surface shape of the cutting edge 31 is obtainable by, for example, applying a well-known honing process to an arrangement position of the cutting edge 31.

Figure 5:
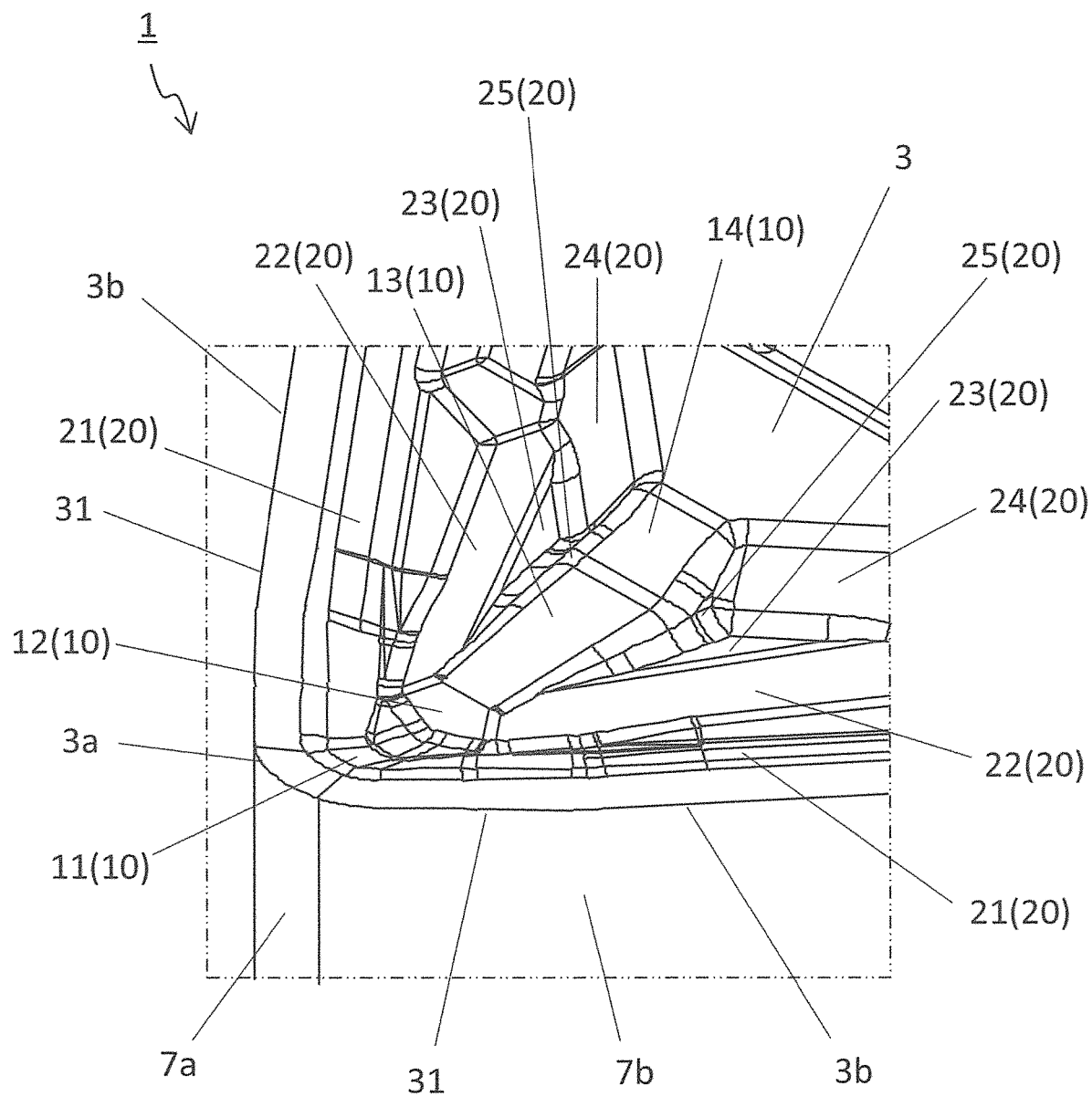
FIG. 5 is an enlarged view in a region B1 illustrated in FIG. 1.
Figure 6:
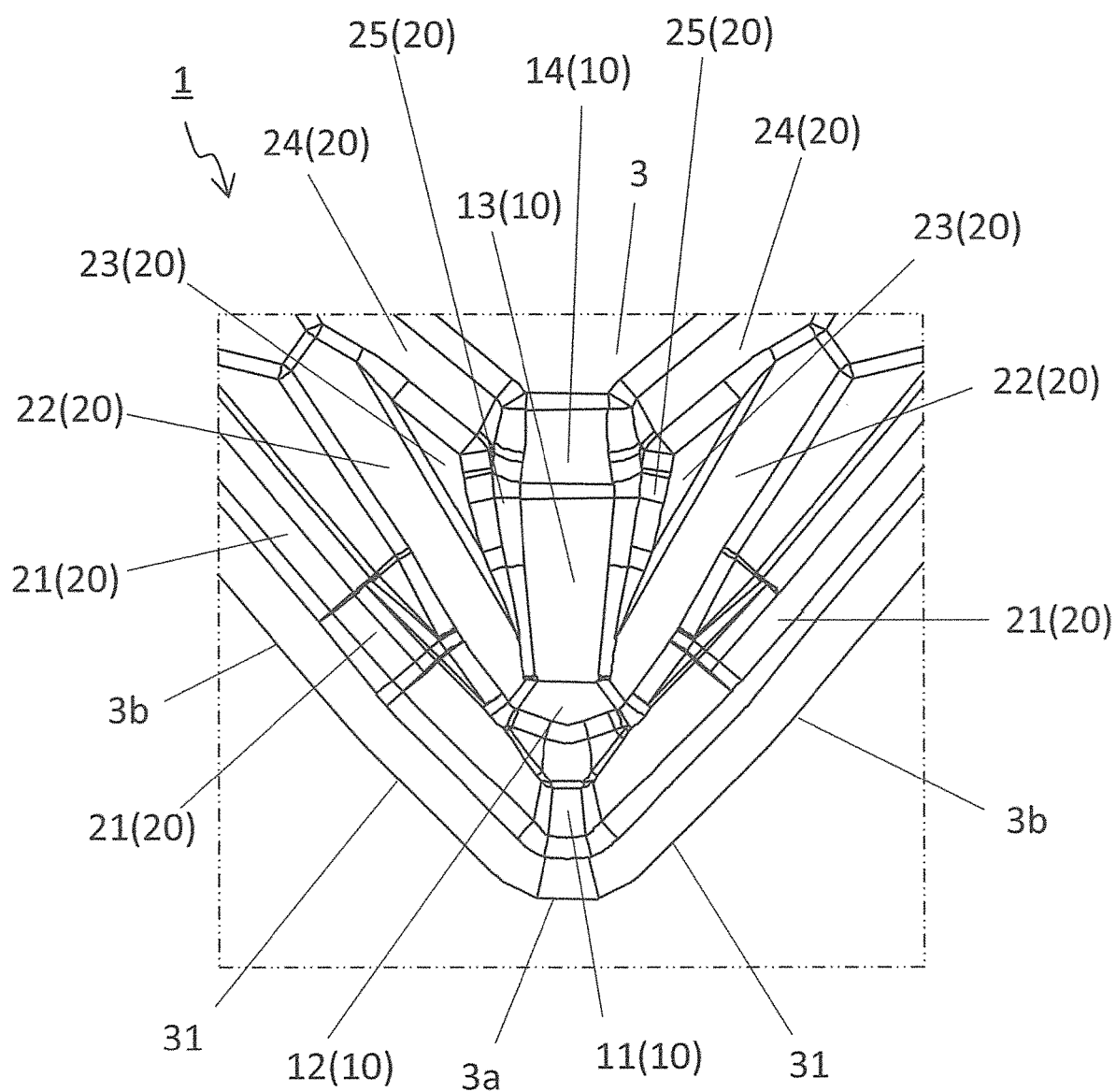
FIG. 6 is an enlarged view in a region B2 illustrated in FIG. 2.

The upper surface 3 in the present non-limiting aspect of the disclosure includes a corner region 10 extending from each of the corner parts 3*a* toward a middle part on the upper surface as illustrated in FIGS. 5 and 6. Here, the middle part may be regarded as, for example, the central axis O1. The corner region 10 includes a first corner surface 11, a second corner surface 12, a third corner surface 13, and a fourth corner surface 14 in order from a side of the corner part 3*a*.

The corner region 10 is described below with reference to FIG. 8. FIG. 8 is a sectional view taken along line C1-C1 in FIG. 7. FIG. 8 illustrates a cross section including a bisector of the corner part 3*a* and the central axis O1 of the through hole 9. The first corner surface 11 is a surface inclined downward as going away from the corner part 3*a*. The first corner surface 11 is illustrated in a straight line shape in the cross section taken along line C1-C1 in the present non-limiting aspect of the disclosure. Although not particularly illustrated, the first corner surface 11 is formed in such a shape as to be curved in a concave shape in a cross section orthogonal to the bisector of the corner part 3a. The first corner surface 11 in the insert 1 also functions as a rake surface along which chips flow during a cutting process.

The second corner surface 12 is a surface which is located closer to the middle part than the first corner surface 11, and which is inclined toward upward as going away from the first corner surface 11. The second corner surface 12 mainly functions as a surface that causes chips to curl in the present non-limiting aspect of the disclosure. The second corner surface 12 is a flat surface in the present non-limiting aspect of the disclosure. Specifically, the second corner surface 12 is illustrated in a straight line shape in the cross section taken along line C1-C1, and also illustrated in a straight line shape in the cross section orthogonal to the bisector of the corner part 3a. The second corner surface 12 need not necessarily be continuous with the first corner surface 11. In other words, another surface may be located between the first corner surface 11 and the second corner surface 12. For example, a flat surface region being parallel to the lower surface 5 may be located between the first corner surface 11 and the second corner surface 12.

The third corner surface 13 is a surface which is located closer to the middle part than the second corner surface 12, and which is inclined toward upward as going away from the second corner surface 12. The third corner surface 13 is intended to ensure space between the second corner surface 12 and the fourth corner surface 14 in the present non-limiting aspect of the disclosure. The third corner surface 13 is a flat surface in the present non-limiting aspect of the disclosure. Specifically, the third corner surface 13 is illustrated in a straight line shape in the cross section taken along line C1-C1, and also illustrated in a straight line shape in the cross section orthogonal to the bisector of the corner part 3a. The third corner surface 13 need not necessarily be continuous with the second corner surface 12. In other words, another surface may be located between the second corner surface 12 and the third corner surface 13. For example, a curved surface region that connects the second corner surface 12 and the third corner surface 13 may be located therebetween.

The fourth corner surface 14 is a surface which is located closer to the middle part than the third corner surface 13, and which is inclined toward upward as going away from the third corner surface 13. The fourth corner surface 14 also mainly functions as a surface that causes chips to curl in the present non-limiting aspect of the disclosure. The fourth corner surface 14 is a flat surface in the present non-limiting aspect of the disclosure. Specifically, the fourth corner surface 14 is illustrated in a straight line shape in the cross section taken along line C1-C1, and also illustrated in a straight line shape in the cross section orthogonal to the bisector of the corner part 3a. The fourth corner surface 14 need not necessarily be continuous with the third corner surface 13. In other words, another surface may be located between the third corner surface 13 and the fourth corner surface 14. For example, a curved surface region that connects to the third corner surface 13 and the fourth corner surface 14 may be located therebetween.

As used above, the term "flat surface" need not have a strictly flat surface shape. For example, "the flat surface" in the above description may have a surface shape indicated by a gentle curved line whose radius of curvature is 5 mm or more in the cross section orthogonal to the corner part 3a as illustrated in FIG. 8, or alternatively may have a surface shape having an arithmetic average surface roughness of approximately 0.5 μm.

FIG. 8 illustrates an inclination angle (a first inclination angle) θ11 of the first corner surface 11, an inclination angle (a second inclination angle) θ12 of the second corner surface 12, an inclination angle (a third inclination angle) θ13 of the third corner surface 13, and an inclination angle (a fourth inclination angle) θ14 of the fourth corner surface 14. The second inclination angle θ12 is greater than the third inclination angle θ13, and the fourth inclination angle θ14 is greater than the second inclination angle θ12 in the present non-limiting aspect of the disclosure. Because the second inclination angle θ12 is greater than the third inclination angle θ13, the fourth inclination angle θ14 is greater not only than the second inclination angle θ12 but also than the third inclination angle θ13.

The inclination angles of the corner surfaces 11, 12, 13, and 14 correspond to angles respectively formed with an imaginary flat surface parallel to a flat surface when the insert 1 is put on the flat surface so that the lower surface 5 comes into contact therewith. In other words, an angle formed with the imaginary flat surface parallel to the lower surface 5 can be taken as an inclination angle. The imaginary flat surface is illustrated as a reference line S in the cross section illustrated in FIG. 8. Alternatively, a line orthogonal to an imaginary straight line passing through the center of the upper surface 3 and the center of the lower surface 5 (the central axis O1 of the through hole 9) may be taken as the reference line S in the present non-limiting aspect of the disclosure.

Chips have a shape with a small width and a small thickness in a cutting process carried out at a small depth of cut and a low feed rate, for example, in cases where only the corner part 3a of the upper surface 3 is used as the cutting edge 31. The chips having the above shape are generally apt to deform and become unstable. In this situation, the chips pass through the first corner surface 11 that functions as the rake surface, and then flow toward the second corner surface 12. Here, the second inclination angle θ12 of the second corner surface 12 closer to the corner part 3a than the third corner surface 13 is greater than the third inclination angle θ13 of the third corner surface 13 in the present non-limiting aspect of the disclosure. Accordingly, the chips that are apt to deform and become unstable can be stably curled on the second corner surface 12.

In particular, when the second corner surface 12 is a flat surface, it is possible to stably bring the chips into contact with the second corner surface 12 in the above cutting process.

Because chips have a greater thickness with increasing feed rate when the depth of cut is small, the second corner surface 12 and the third corner surface 13 are subjected to a greater load. Subsequently to the second corner surface 12, the third corner surface 13 is inclined upward in the present non-limiting aspect of the disclosure. Therefore, a part of the corner region 10 which is made up of the second corner surface 12 and the third corner surface 13 has high strength, thus leading to the insert 1 with good durability.

The fourth inclination angle θ14 is greater than each of the second inclination angle θ12 and the third inclination angle θ13 in the present non-limiting aspect of the disclosure. Consequently, chips are less likely to climb over the fourth corner surface 14 under cutting conditions, namely, a small depth of cut and a high feed rate. This makes it possible to stably curl the chips along the fourth corner surface 14.

The chips curled along the fourth corner surface 14 tend to have a large curl diameter in a cutting process at a high feed rate. The third corner surface 13 whose inclination angle is smaller than each of the second inclination angle θ12 and the fourth inclination angle θ14 is located between the second corner surface 12 and the fourth corner surface 14 in the present non-limiting aspect of the disclosure. This ensures a large space between the corner part 3a and the fourth corner surface 14. Consequently, chip clogging is less likely to occur, thereby stably curling the chips.

Because the second inclination angle θ12 of the second corner surface 12 is smaller than the fourth inclination angle θ14 of the fourth corner surface 14, chips are less likely to be curled along the second corner surface 12 during a cutting process carried out at a high feed rate even if the chips come into contact with the second corner surface 12. The chip clogging is less likely to occur because chips having a large curling diameter are less likely to occur on the second corner surface 12 located near the corner part 3a.

For the foregoing reasons, the insert 1 of the present non-limiting aspect of the disclosure including the corner region 10 is capable of suitably cutting off a workpiece in both the cutting process at the low feed rate and the cutting process at the high feed rate when the depth of cut is small.

In the present non-limiting aspect of the disclosure, sizes L of individual corner surfaces (lengths of the individual corner surfaces) in a direction along the bisector of the corner part 3a in a top view may be set as follows. For example, a size L11 of the first corner surface 11 is 0.2-0.35 mm, a size L12 of the second corner surface 12 is 0.2-0.3 mm, a size L13 of the third corner surface 13 is 0.8-1.1 mm, and a size L14 of the fourth corner surface L14 is 0.2-0.4 mm. Here, the size L13 of the third corner surface 13 may be greater than each of the sizes of L11, L12, and L14 of other corner surfaces. This ensures a large space between the corner part 3a and the fourth corner surface 14. Consequently, chip clogging is less likely to occur, thereby stably curling the chips.

In the present non-limiting aspect of the disclosure, sizes W of the individual corner surfaces (widths of the individual corner surfaces) in the direction orthogonal to the bisector of the corner part 3a in a top view may be set as follows. For example, a size W11 of the first corner surface 11 is 0.2-0.35 mm, a size W12 of the second corner surface 12 is 0.2-0.5 mm, a size W13 of the third corner surface 13 is 0.3-0.7 mm, and a size W14 of the fourth corner surface 14 is 0.3-0.6 mm. Here, the size W12 of the second corner surface 12 may be greater than each of the sizes W11, W13, and W14 of the other corner surfaces. Here, when the sizes W of the individual corner surfaces change along the bisector of the corner part 3a, the sizes W of the individual corner surfaces may be respectively maximum values of the sizes of the individual corner surfaces in the direction orthogonal to the bisector of the corner part 3a. In the present non-limiting aspect of the disclosure, the size W12 of the second corner surface 12 in the direction orthogonal to the bisector of the corner part 3a reaches a maximum at a side of the corner part 3a and reaches a minimum at a side of the middle part.

As illustrated in FIG. 6, the size W13 of the third corner surface 13 may increase as going toward the middle part of the upper surface 3, and the size W14 of the fourth corner surface 14 may decrease as going away from the third corner surface 13. In this case, generated chips are less likely to climb over because the fourth corner surface 14, whose height from the lower surface 5 is relatively high, is located too close to the side part 3b. It is therefore possible to stably curl the chips by the corner region 10 and a side region 20.

As illustrated in FIGS. 5 and 6, the upper surface 3 in the present non-limiting aspect of the disclosure may include the side region 20 located along the side part 3b. Here, the side region 20 includes a first surface 21, a second surface 22, a third surface 23, and a fourth surface 24 in order from a side of the side part 3b. The first surface 21 extends toward the first corner surface 11. The second surface 22 extends toward the second corner surface 12. The fourth surface 24 is extends toward the fourth corner surface 14. The third surface 23 is located between the second surface 22 and the fourth surface 24. Alternatively, the side region 20 may be located at both sides of the corner region 10. In other words, the upper surface 3 may include a pair of the side regions 20.

A region of the upper surface 3, which is made up of the side region 20, specifically, the first surface 21, the second surface 22, the third surface 23, and the fourth surface 24, is located from the side part 3b toward the middle part of the upper surface 3. The first surface 21 is a surface inclined downward as going away from the side part 3b. The first surface 21 functions as a rake surface along which chips flow during a cutting process in the present non-limiting aspect of the disclosure.

Figure 10:
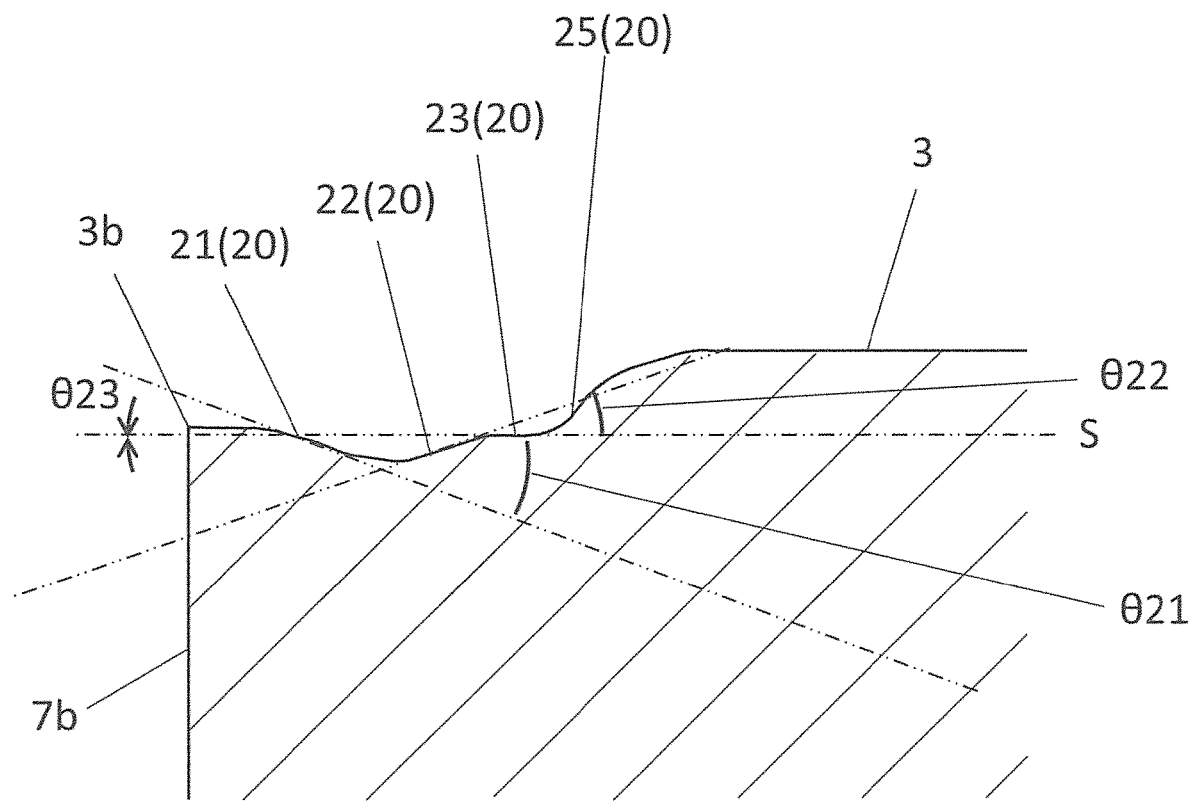
FIG. 10 is a sectional view taken along line C3-C3 in the insert illustrated in FIG. 7.

The second surface 22 is a surface which is located closer to the middle part than the first surface 21, and which is inclined upward as going away from the side part 3b, in other words, from the first surface 21. The second surface 22 mainly functions as a surface that causes chips to curl in the present non-limiting aspect of the disclosure. The second surface 22 is a flat surface in the present non-limiting aspect of the disclosure. Specifically, the second surface 22 is illustrated in a straight line shape in a cross section orthogonal to the side part 3b, and also illustrated in a straight line shape in a cross section parallel to the side part 3b. The second surface 22 need not necessarily be continuous with the first surface 21. In other words, another surface may be located between the first surface 21 and the second surface 22. For example, a flat surface region may be located between the first surface 21 and the second surface 22 in the present non-limiting aspect of the disclosure as illustrated in FIG. 10. With this configuration, chips are less likely to flow vigorously and come into a strong contact with the second surface 22.

Figure 11:
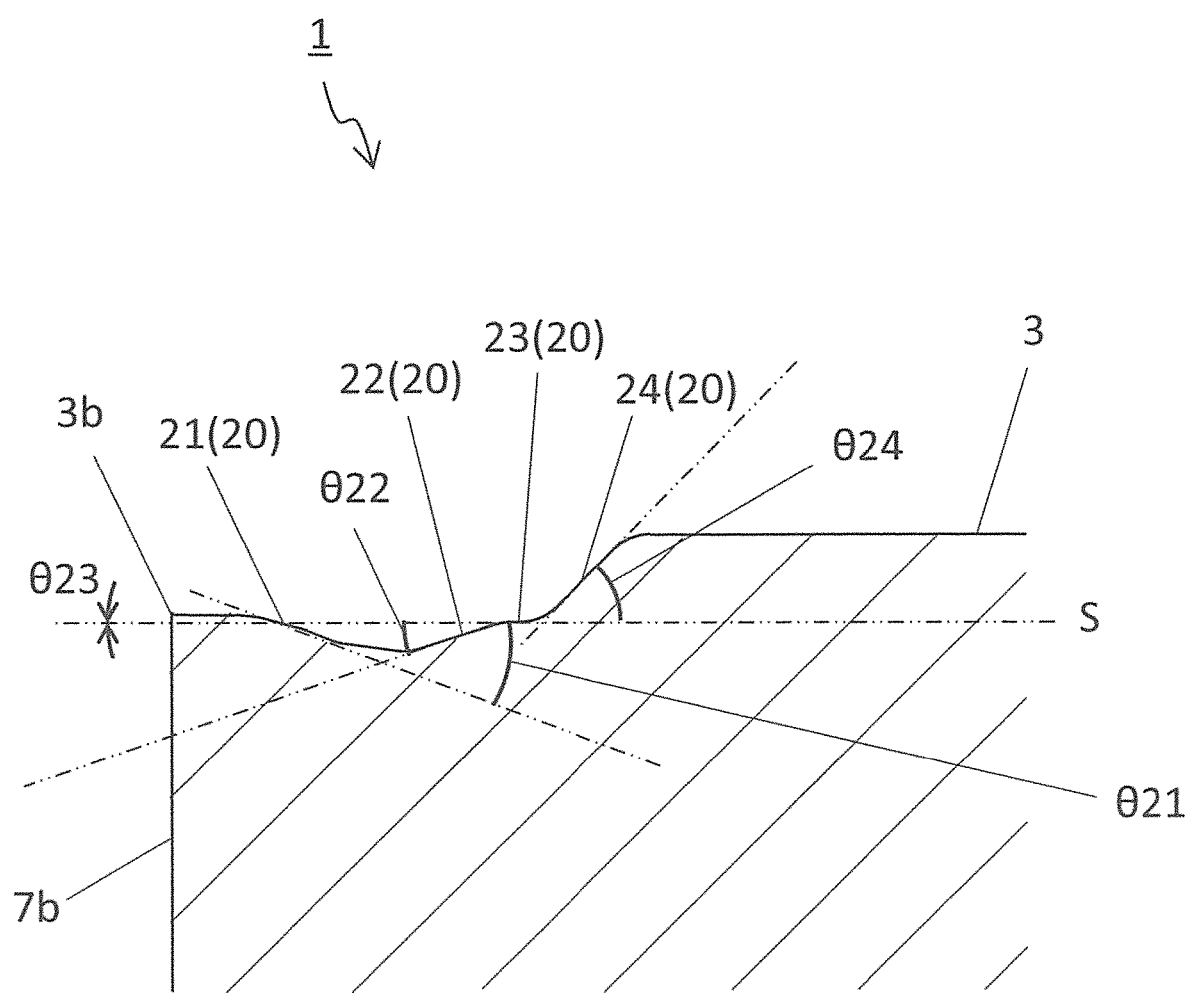
FIG. 11 is a sectional view taken along line C4-C4 in the insert illustrated in FIG. 7.

The third surface 23 is a flat surface located closer to the middle part than the second surface 22. The third surface 23 is intended to ensure space between the second surface 22 and the fourth surface 24 in the present non-limiting aspect of the disclosure. FIGS. 10 and 11 illustrate an inclination angle (a seventh inclination angle) θ23 of the third surface 23. The third surface 23 need not necessarily be inclined relative to the reference line S, but may be parallel to the reference line S (an imaginary flat plane). Specifically, the seventh inclination angle θ23 may be 0°. The third surface 23 need not necessarily be continuous with the second surface 22. In other words, another surface may be located between the second surface 22 and the third surface 23. For example, a curved surface region that connects to the second surface 22 and the third surface 23 may be located therebetween.

The fourth surface 24 is a surface which is located closer to the middle part than the third surface 23, and which is inclined toward upward as going away from the side part 3b, namely, the third surface 23. The fourth surface 24 mainly functions as a surface that causes chips to curl in the present non-limiting aspect of the disclosure. The fourth surface 24 is a flat surface in the present non-limiting aspect of the disclosure. Specifically, the fourth surface 24 is illustrated in a straight line shape in the cross section orthogonal to the side part 3b, and also illustrated in a straight line shape in the cross section parallel to the side part 3b. The fourth surface 24 need not necessarily be continuous with the third surface 23. In other words, another surface may be located between the third surface 23 and the fourth surface 24. For example, a curved surface region that connects to the third surface 23 and the fourth surface 24 may be located therebetween.

FIG. 11 illustrates an inclination angle (a fifth inclination angle) θ21 of the first surface 21, an inclination angle (a sixth inclination angle) θ22 of the second surface 22, an inclination angle (a seventh inclination angle) θ23 of the third surface 23, and an inclination angle (an eighth inclination angle) θ24 of the fourth surface 24.

The sixth inclination angle θ22 is greater than the seventh inclination angle θ23, and the eighth inclination angle θ24 is greater than the sixth inclination angle θ22 in a cross section including the first surface 21, the second surface 22, the third surface 23, and the fourth surface 24, in the present non-limiting aspect of the disclosure as illustrated in FIG. 11.

Figure 7:
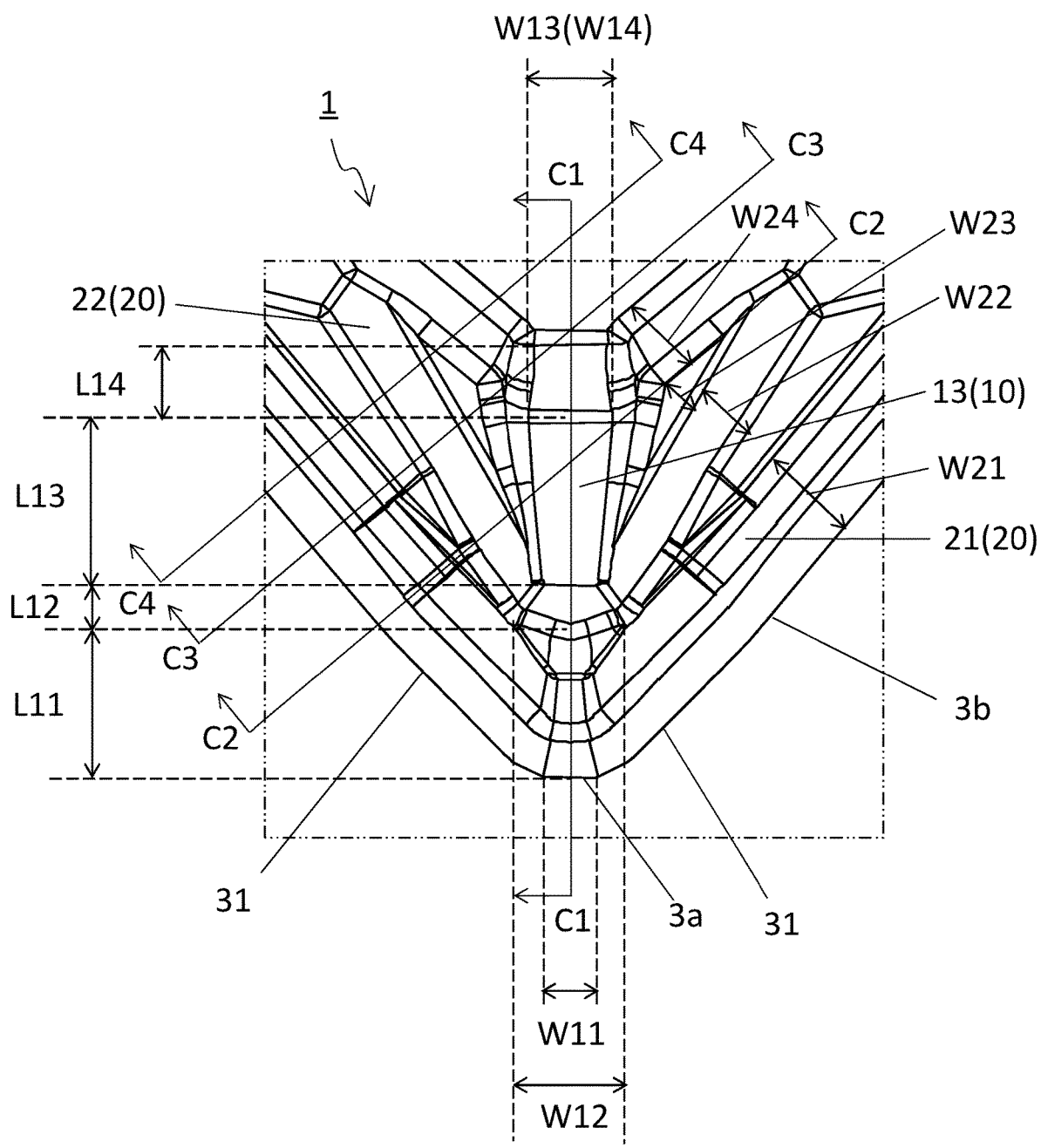
FIG. 7 is an enlarged view illustrating the same region as a region illustrated in FIG. 6.
Figure 8:
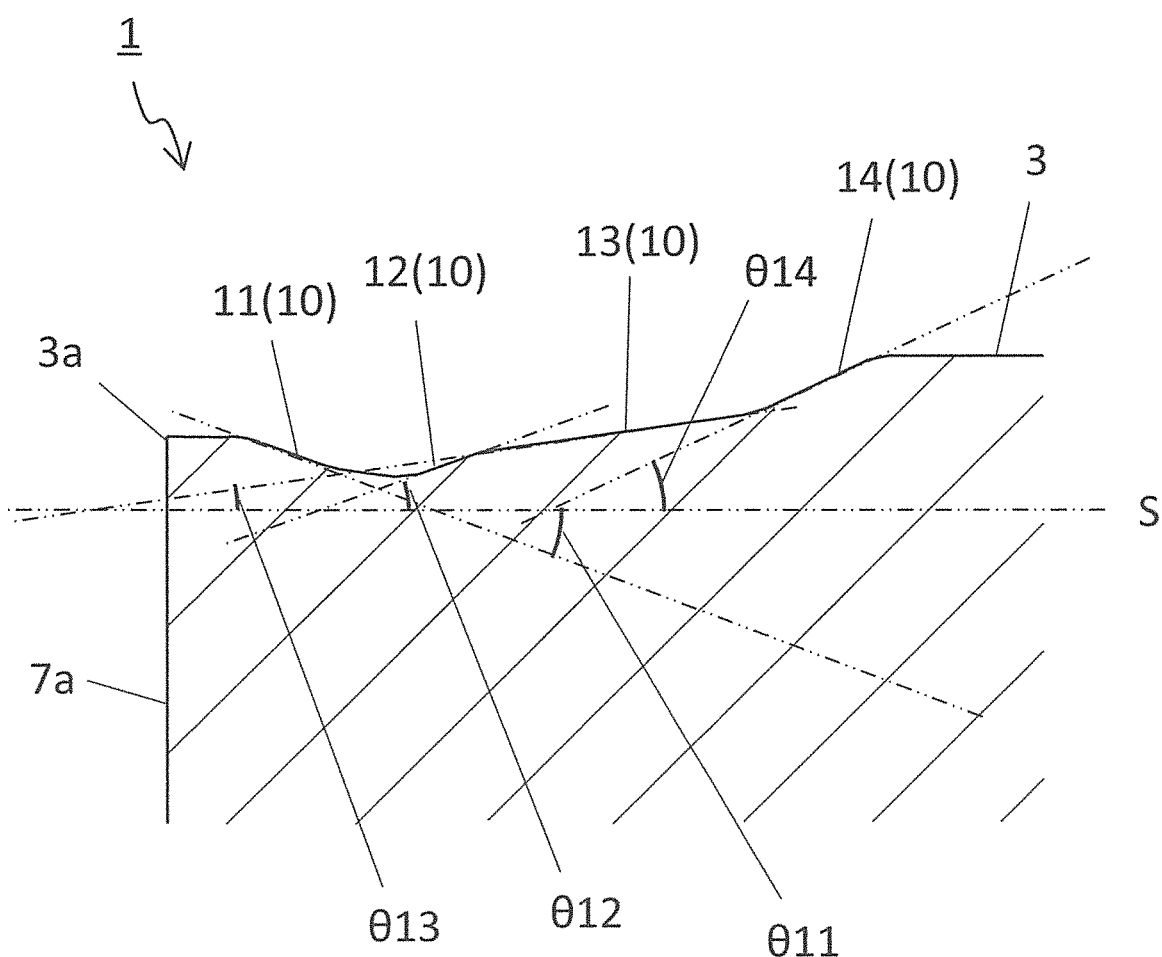
FIG. 8 is a sectional view taken along line C1-C1 in the insert illustrated in FIG. 7.
Figure 9:
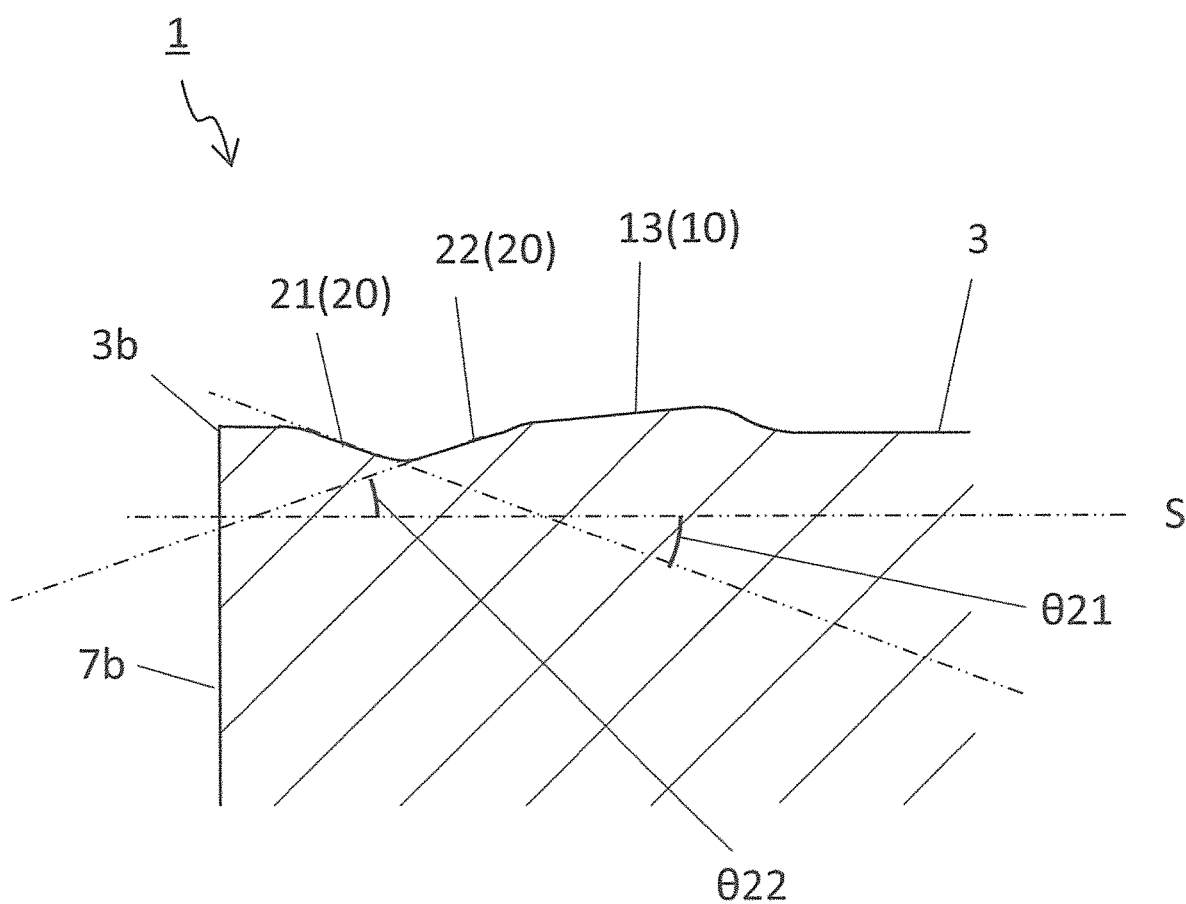
FIG. 9 is a sectional view taken along line C2-C2 in the insert illustrated in FIG. 7.

FIG. 9 illustrates a cross section which includes the first surface 21 and the second surface 22 and is orthogonal to the side part 3b as illustrated in FIG. 7. FIG. 10 illustrates a cross section which includes the first surface 21, the second surface 22, and the third surface 23 and is orthogonal to the side part 3b as illustrated in FIG. 7. FIG. 11 illustrates a cross section which includes the first surface 21, the second surface 22, the third surface 23, and the fourth surface 24 and is orthogonal to the side part 3b as illustrated in FIG. 7. FIGS. 9 to 11 are the cross sections parallel to each other.

Chips have a shape with a large width and a small thickness in a cutting process carried out at a large depth of cut and a low feed rate, for example, in cases where the corner part 3a and the side part 3b on the upper surface 3 are used as the cutting edge 31. The chips having the above shape are generally apt to deform and become unstable. In this situation, the chips pass through the first surface 21 and then flow toward the second surface 22. Here, the sixth inclination angle θ22 of the second surface 22 closer to the side part 3b than the third surface 23 may be greater than the seventh inclination angle θ23 of the third surface 23 in the present non-limiting aspect of the disclosure. When this relationship is satisfied, the chips that are apt to deform and become unstable can be stably curled on the second surface 22.

In particular, when the second surface 22 is a flat surface, it is possible to stably bring the chips into contact with the second surface 22 in the above cutting process.

Chips have a larger thickness with increasing feed rate. The eighth inclination angle θ24 may be greater than each of the sixth inclination angle θ22 and the seventh inclination angle θ23 in the present non-limiting aspect of the disclosure. When this relationship is satisfied, the chips are less likely to climb over the fourth surface 24 under cutting conditions, namely, a high feed rate. This makes it possible to stably curl the chips along the fourth surface 24.

In particular, when the fourth surface 24 is a flat surface, it is possible to stably bring the chips into contact with the fourth surface 24 in the above cutting process.

The chips curled along the fourth surface 24 tend to have a large curl diameter in a cutting process carried out at a high feed rate. The third surface 23 whose inclination angle is smaller than each of the sixth inclination angle θ22 and the eighth inclination angle θ24 is located between the second surface 22 and the fourth surface 24 in the present non-limiting aspect of the disclosure. This ensures a large space between the side part 3b and the fourth surface 24. Consequently, chip clogging is less likely to occur, thereby stably curling the chips.

When the inclination angle θ22 of the second surface 22 is smaller than the inclination angle θ24 of the fourth surface 24, chips are less likely to be curled along the second surface 22 even when the chips come into contact with the second surface 22. The chip clogging is less likely to occur when chips having a large curling diameter are less likely to be generated on the second surface 22 located near the side part 3b.

For the foregoing reasons, the insert 1 of the present non-limiting aspect of the disclosure including the side region 20 is capable of suitably cutting off a workpiece in both the cutting process at the low feed rate and the cutting process at the high feed rate even when the depth of cut is large. When a pair of the side regions 20 are respectively located at both sides of the corner region 10 in the insert 1 of the present non-limiting aspect of the disclosure, it is possible to more stably discharge chips under cutting conditions, namely, a small depth of cut and a high feed rate.

In the present non-limiting aspect of the disclosure, sizes W of the individual surfaces (widths of the individual surfaces) in a direction orthogonal to the side part 3b in a top view may be set as follows. For example, a size W21 of the first surface 21 is 0.2-0.4 mm, a size W22 of the second surface 22 is 0.2-0.3 mm, a size W23 of the third surface 13 is 0.1-0.2 mm, and a size W24 of the fourth surface 24 is 0.1-0.3 mm. Here, when the sizes W of the individual surfaces change along the bisector of the corner part 3a, the sizes W of the individual corner surfaces may be respectively maximum values of the sizes of the individual surfaces in the direction orthogonal to the side part 3b.

Because chips tend to have a smaller width when the depth of cut is smaller than when the depth of cut is large, behavior of the chips tends to become more unstable. An upper end of the second corner surface 12 may be located lower than an upper end of the second surface 22 in the present non-limiting aspect of the disclosure. With this configuration, chips are less likely to come into contact with the second corner surface 12, thereby stably causing the chips to come into contact with the second surface 22 in the case of a small depth of cut and a high feed rate. It is therefore possible to stably cause the chips to flow toward the third corner surface 13 and the fourth corner surface 14.

Here, the upper end of the second corner surface 12 corresponds to a part of the second corner surface 12 which is located most far away from the lower surface 5 in a direction parallel to an imaginary straight line passing through the center of the upper surface 3 and the center of the lower surface 5 (the central axis O1 of the through hole 9). Similarly, the upper end of the second surface 22 corresponds to a part of the second surface 22 which is located most far away from the lower surface 5 in the direction parallel to the imaginary straight line passing through the center of the upper surface 3 and the center of the lower surface 5 (the central axis O1 of the through hole 9). The second corner surface 12 and the second surface 22 are inclined surfaces that are inclined upward as going toward the middle part in the present non-limiting aspect of the disclosure. The upper end of the second corner surface 12 and the upper end of the second surface 22 can therefore be rephrased as an inner peripheral end of the second corner surface 12 and an inner peripheral end of the second surface 22, respectively.

Alternatively, an upper end of the third corner surface 13 may be located above an upper end of the third surface 23 in the present non-limiting aspect of the disclosure. With this configuration, space for separately disposing a surface can be ensured between the third corner surface 13 and the third surface 23. The surface that can be disposed separately contributes to stably curling chips generated in the case of a middle level of depth of cut and a middle level of feed rate. The upper end of the third corner surface 13 and the upper end of the third surface 23 can be defined similarly to the upper end of the second corner surface 12 and the upper end of the second surface 22 described above.

Furthermore, the third surface 23 is located inside the side part 3b of the upper surface 3, and the third corner surface 13 is located inside the corner part 3a of the upper surface 3 in the present non-limiting aspect of the disclosure. For example, in the case of a large depth of cut and a high feed rate, a region at which the third corner surface 13 is located is therefore prone to a larger load than a region at which the third surface 23 is located. Here, the third inclination angle θ13 of the third corner surface 13 may be greater than the seventh inclination angle θ23 of the third surface 23 in the present non-limiting aspect of the disclosure. When this relationship is satisfied, strength of the region at which the third corner surface 13 is located can be enhanced than the region at which the third surface 23 is located, thus leading to the durable insert 1.

The second inclination angle θ12 of the second corner surface 12 may be greater than the sixth inclination angle θ22 of the second surface 22 in the present non-limiting aspect of the disclosure. When this relationship is satisfied, the action of stably curling chips can be enhanced even in the case of a small depth of cut.

Each of the first inclination angle θ21 of the first surface 21, the second inclination angle θ22 of the second surface 22, and the seventh inclination angle θ23 of the fourth surface 24 may be constant along the side part 3b in the present non-limiting aspect of the disclosure. In this case, chip curling action can be stabilized irrespective of the dimension of depth of cut.

A difference between the second inclination angle θ12 of the second corner surface 12 and the fourth inclination angle θ14 of the fourth corner surface 14 may be smaller than a difference between the sixth inclination angle θ22 of the second surface 22 and the eighth inclination angle θ24 of the fourth surface 24. When this relationship is satisfied, the third corner surface 13 located between the second corner surface 12 and the fourth corner surface 14 is less likely to be too far away from the corner part 3a, and it is possible to ensure curling actions of the second corner surface 12 and the fourth corner surface 14 in the corner region 10. This ensures chip discharge performance at a small depth of cut and a high feed rate. Additionally, chips generated at a large depth of cut and a high feed rate are less likely to climb over the fourth surface 24, thus ensuring chip discharge performance in the case of the large depth of cut and the high feed rate. This leads to stable chip disposal in the case of the high feed rate irrespective of the dimension of depth of cut.

The second inclination angle θ12 of the second corner surface 12 may be greater than the inclination angle θ22 of the second surface 22. When this relationship is satisfied, the length L12 of the second corner surface 12 becomes relatively short, and it is therefore easy to ensure a large length L13 of the third corner surface 3. This facilitates a smooth guide of chips to the third corner surface 13 in the case of a small depth of cur and a high feed rate.

The inclination angle θ13 of the third corner surface 13 may be greater than the inclination angle θ23 of the third surface 23, and also smaller than each of the inclination angle θ22 of the second surface 22 and the inclination angle θ24 of the fourth surface 24. When these relationships are satisfied, chip curling action can be enhanced under cutting conditions, namely, a middle level of depth of cut and a middle level of feed rate.

As described earlier, the shape of the lower surface 5 is identical to the shape of the upper surface 3, and a cutting edge may also be located along at least a part of intersection of the lower surface 5 and the side surface 7 in the present non-limiting aspect of the disclosure. In this case, the insert 1 is usable for a cutting process in a state in which the upper surface 3 and the lower surface 5 are turned over. Here, a height of an upper end of the fourth corner surface 14 is equal to a height of an upper end of the fourth surface 24 in the insert 1 of the present non-limiting aspect of the disclosure. It is therefore possible to make the upper surface 3 function stably as a seating surface with respect to a pocket.

The phrase that "the height of the upper end of the fourth corner surface 14 is equal to the height of the upper end of the fourth surface 24" denotes that both heights need not be strictly the same. For example, there may be a gap of approximately 2% therebetween. Specifically, assuming that the height of the upper end of the fourth corner surface 14 is 1, the height of the upper end of the fourth surface 24 needs to be approximately 0.98-1.02. Here, the upper end of the fourth corner surface 14 and the upper end of the fourth surface 24 can be defined similarly to the upper end of the second corner surface 12 and the upper end of the second surface 22 described above. Moreover, the height of the upper end of the fourth corner surface 14 is a size between the lower surface 5 and the upper end of the fourth corner surface 14 in a direction parallel to the imaginary straight line passing through the center of the upper surface 3 and the center of the lower surface 5 (the central axis O1 of the through hole 9). Similarly, the height of the upper end of the fourth surface 24 is a size between the lower surface 5 and the upper end of the fourth surface 24 in the direction parallel to the imaginary straight line passing through the center of the upper surface 3 and the center of the lower surface 5 (the central axis O1 of the through hole 9).

Because chips tend to have a smaller width when the depth of cut is smaller than when the depth of cut is large, the behavior of the chips tends to become more unstable. A width of the third corner surface 13 (a size W of the third corner surface 13) may increase as going away from the corner part 3a in a top view in the present non-limiting aspect of the disclosure. With this configuration, a region located on a side of the third corner surface 13 having a curling function becomes closer to the side 3b in a cutting process carried out at a middle level of depth of cut and a middle level of feed rate. This makes it possible to stably bring chips generated during the cutting process into contact with the third corner surface 13, thereby enhancing chip curling action.

The width of the third corner surface 13 (the size W of the third corner surface 13) may increase as going away from the corner part 3a, and the width of the fourth corner surface 14 (the size W of the fourth corner surface 14) may decrease as going away from the corner part 3a in a top view in the present non-limiting aspect of the disclosure. This configuration ensures a width in a direction along the side part 3b on the fourth surface 24 adjacent to the fourth corner surface 14. It is therefore possible to stably curl chips by the fourth surface 24 during a cutting process carried out at a large depth of cut and a high feed rate.

The side region 20 may further include a fifth surface 25 in the present non-limiting aspect of the disclosure. Here, the fifth surface 25 is located between the third corner surface 13 and the fourth corner surface 14 and the third surface 23 and the fourth surface 24. The fifth surface 25 is inclined downward as going away from the third corner surface 13 and the fourth corner surface 14 as illustrated in FIGS. 5, 6, and 10. When provided with the fifth surface 25, a stable chip curling action can be enhanced irrespective of the dimension of depth of cut.

The cutting edge 31 may have a straight line shape in a side view in the present non-limiting aspect of the disclosure. Here, a height of the cutting edge 31 from the lower surface 5 may be constant.

The third surface 23 may be parallel to the lower surface 5, or alternatively may be inclined downward or may be a downwardly convex curved line as going away from the cutting edge 31 in a sectional view orthogonal to the cutting edge 31. In either case, it is possible to ensure chip flow space between the second surface 22 and the fourth surface 24, and chip clogging is less likely to occur.

The upper surface 3 may further include a land part located along the cutting edge 31 in the present non-limiting aspect of the disclosure. Specifically, the upper surface 3 may further include the land part located along the corner part 3*a* and the side part 3*b*. More specifically, the land part may be located between the corner part 3*a* and the first corner surface 11, and between the side part 3*b* and the first surface 21 on the upper surface 3. In this case, rigidity of cutting edge can be further enhanced to achieve excellent cutting performance even under more severe cutting conditions.

Although the insert 1 of one of the embodiments has been described with reference to the drawings, the inserts of the present disclosure are not limited to those which have the configuration of the foregoing embodiments, and include those which are subjected to modification not particularly described in detail without departing from the gist of the present disclosure.

For example, even though the present non-limiting aspect of the disclosure describe and illustrate the embodiments in which the first corner surface 11 is the concave curved surface, and the second corner surface 12, the third corner surface 13, and the fourth corner surface 14 are the flat surfaces, the inserts of the present disclosure are not limited thereto. Specifically, each of these corner surfaces in the inserts of the present disclosure may have any shape insofar as the inclination angles of these corner surfaces constituting the corner region 10 satisfy the foregoing relationship. This is also true for the shapes of the surfaces constituting the side region 20.

<Cutting Tool>

A cutting tool 101 in one of embodiments is described below with reference to the drawings.

Figure 12:
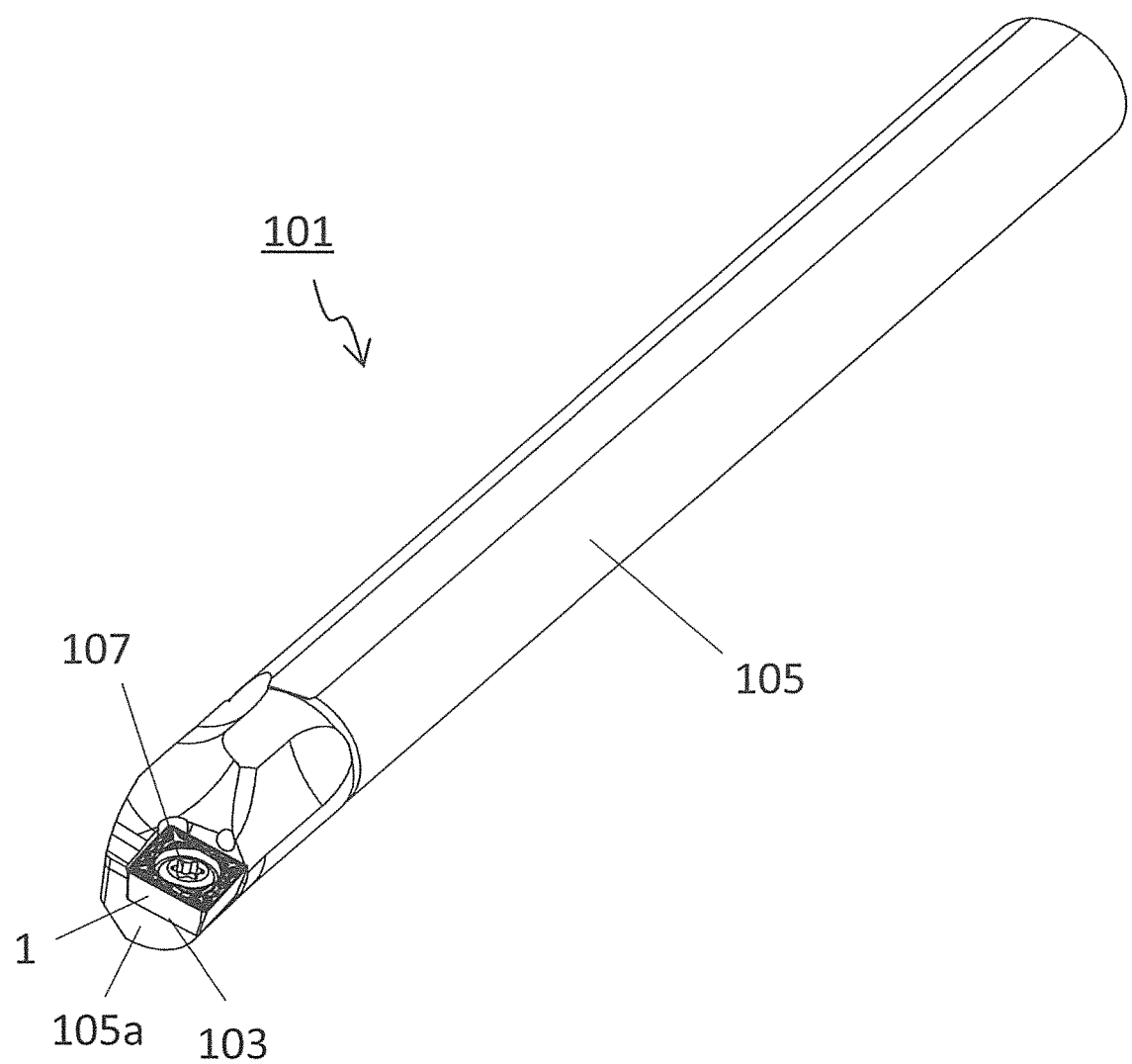
FIG. 12 is a perspective view illustrating a cutting tool.

As illustrated in FIG. 12, the cutting tool 101 of the present non-limiting aspect of the disclosure includes a holder 105 having a pocket 103 at a side of a front end 105*a*, and the insert 1 located at the pocket 103. The insert 1 is attached so that a part of a ridge part which is usable as the cutting edge 31 protrudes from the front end of the holder 105 in the cutting tool 101 of the present non-limiting aspect of the disclosure.

The holder 105 is a bar-shaped body that extends long and narrow. The single pocket 103 is disposed at the side of the front end 105*a* of the holder 105. The pocket 103 is configured to receive the insert and opens into a front end surface of the holder 105. Here, it becomes easy to attach the insert by configuring so that the pocket 103 also opens into a side surface of the holder 105. Specifically, the pocket 103 includes a seating surface parallel to a lower surface (not illustrated) of the holder 105, and a constraining side surface being inclined relative to the seating surface.

The insert 1 is located at the pocket 103. The lower surface of the insert 1 may be directly contacted with the pocket 103. Alternatively, a sheet may be held between the insert 1 and the pocket 103.

The insert 1 is attached so that a part of the ridge part which is usable as the cutting edge 31 protrudes outward from the holder 105. The insert 1 is attached to the holder 105 by a fixing screw 107 in the present non-limiting aspect of the disclosure. Specifically, screw portions are screwed together by inserting the fixing screw 107 into the through hole of the insert 1, and by inserting a front end of the fixing screw 107 into a screw hole (not illustrated) formed in the insert pocket 103. Thus, the insert 1 is attached to the holder 105.

As a material of the holder 105, for example, steel and cast iron are usable. Of these materials, high rigidity steel may be used as the material of the holder 105.

The present non-limiting aspect of the disclosure illustrate and describe the cutting tool used for a so-called turning process. Examples of the turning process include inner diameter machining, outer diameter machining, and grooving process. The cutting tool is not limited to those which are used for the turning process. For example, the insert of the above embodiments may be applied to a cutting tool used for a milling process.

<Method of Manufacturing Machined Product>

A method of manufacturing a machined product in one of embodiments of the present disclosure is described below with reference to the drawings by exemplifying the case of using the cutting tool 101 in the foregoing embodiments.

The machined product is manufacturable by carrying out a cutting process of a workpiece 201. The method of manufacturing a machined product in the present non-limiting aspect of the disclosure includes the following steps (1) to (4).

Figure 13:
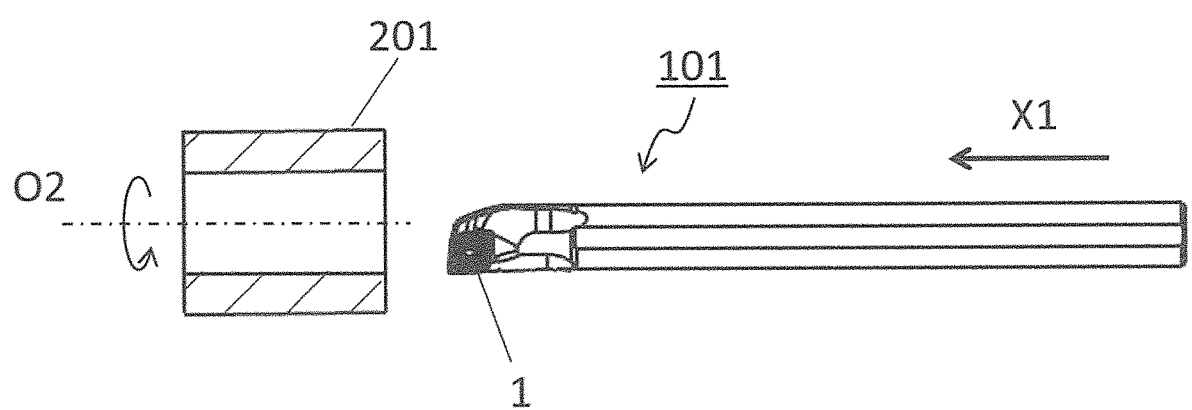
FIG. 13 is a schematic diagram illustrating a step in a method of manufacturing a machined product.
Figure 14:
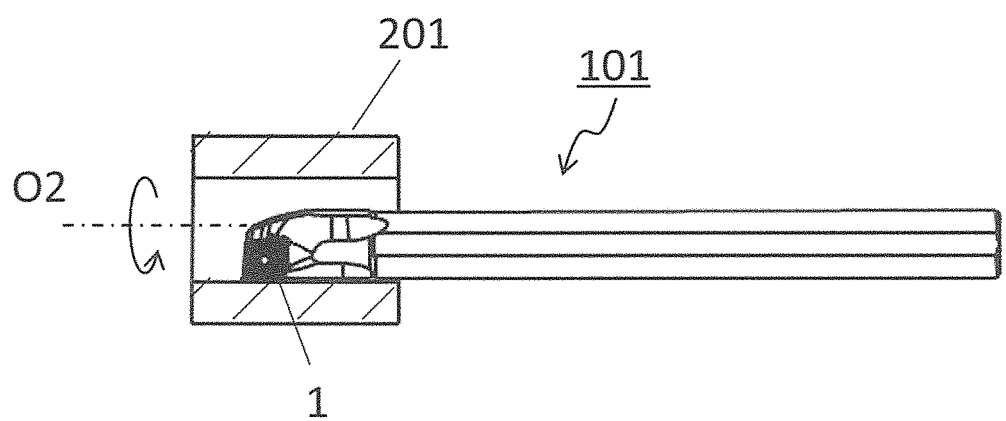
FIG. 14 is a schematic diagram illustrating a step in the method of manufacturing a machined product.
Figure 15:
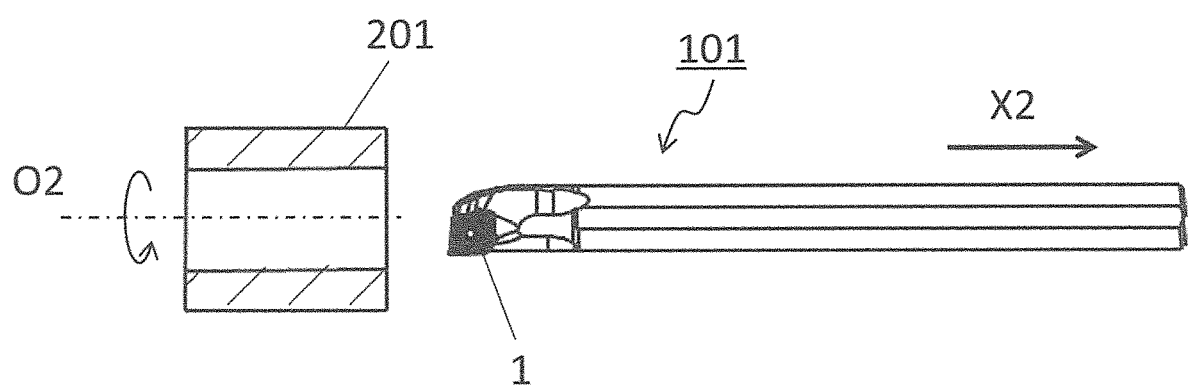
FIG. 15 is a schematic diagram illustrating a step in the method of manufacturing a machined product.

(1) rotating the prepared workpiece 201 (refer to FIG. 13);

(2) bringing the cutting tool 101 close to the workpiece 201 by moving the cutting tool 101 in X1 direction toward the workpiece 201 being rotated (refer to FIG. 13);

(3) machining a surface of the workpiece 201 by bringing the cutting tool 101 closer to the workpiece 201 so that the cutting edge 31 of the cutting tool 101 is contacted with a desired position on the surface of the workpiece 201 being rotated (refer to FIG. 14); and (4) moving the cutting tool 101 away from the workpiece 201 in X2 direction (refer to FIG. 15).

Examples of materials of the workpiece 201 prepared in the step (1) include aluminum, carbon steel, alloy steel, stainless steel, cast iron, and nonferrous metals.

The step (2) is performable, for example, by bringing the cutting tool 101 near the workpiece 201 in a state in which the workpiece 201 is rotated around the axis O2. In this step, the workpiece 201 and the cutting tool 101 need to be relatively close to each other. Alternatively, the workpiece 201 may be brought near the cutting tool 101.

Also in the step (4), the workpiece 201 and the cutting tool 101 need to be relatively away from each other as in the case with the step (2). For example, the workpiece 201 may be moved away from the cutting tool 101.

The machined product is obtainable through the steps as described above. With the method of manufacturing a machined product in the present non-limiting aspect of the disclosure, the use of the cutting tool 101 makes it possible to suitably carry out the cutting process in the case of a small depth of cut even under cutting process conditions in which the feed rate is decreased or increased. This leads to the machined product with a high precision machined surface.

When the foregoing cutting process of the workpiece 201 is carried out a plurality of times, it is necessary to repeat the step of bringing the cutting edge of the cutting tool 101 into contact with different portions of the workpiece 201, while keeping the workpiece 201 rotated.

Although the embodiments of the present disclosure have been illustrated and described above, the present disclosure is not limited to the foregoing embodiments. It is, of course, possible to make any optional ones insofar as they do not depart from the gist of the present disclosure.

DESCRIPTION OF THE REFERENCE NUMERALS 1 insert
3 upper surface
3a corner part
3b side part
5 lower surface
7 side surface
9 through hole
10 corner region
11 first corner surface
12 second corner surface
13 third corner surface
14 fourth corner surface
20 side region
21 first surface
22 second surface
23 third surface
24 fourth surface
25 fifth surface
31 cutting edge
101 cutting tool
103 pocket
105 holder
107 fixing screw
201 workpiece
O1 central axis (of insert)
O2 axis (of workpiece)
θ11 first inclination angle (of first corner surface)
θ12 second inclination angle (of second corner surface)
θ13 third inclination angle (of third corner surface)
θ14 fourth inclination angle (of fourth corner surface)
θ21 fifth inclination angle (of first surface)
θ22 sixth inclination angle (of second surface)
θ23 seventh inclination angle (of third surface)
θ24 eighth inclination angle (of fourth surface)

The invention claimed is:

1. An insert, comprising:
an upper surface comprising at least one corner part and a plurality of side parts; and
a side surface adjacent to the upper surface, wherein
the upper surface comprises a corner region extending from the corner part toward a middle part on the upper surface,
the corner region comprises a first corner surface, a second corner surface, a third corner surface, and a fourth corner surface which are located sequentially in order from a side of the corner part,
the first corner surface is inclined downward as going away from the corner part,
the second corner surface is inclined upward as going away from the first corner surface,
the third corner surface is inclined upward as going away from the second corner surface,
the fourth corner surface is inclined upward as going away from the third corner surface, and
an inclination angle θ12 of the second corner surface is greater than an inclination angle θ13 of the third corner surface, and an inclination angle θ14 of the fourth corner surface is greater than the inclination angle θ12 of the second corner surface.

2. The insert according to claim 1, wherein
the upper surface further comprises a side region located along the side part,
the side region comprises a first surface, a second surface, a third surface, and a fourth surface which are located sequentially in order from a side of the side part,
the first surface extends toward the first corner surface,
the second surface extends toward the second corner surface,
the third surface is located between the second surface and the fourth surface,
the fourth surface extends toward the fourth corner surface, and wherein
in a cross section including the first surface, the second surface, the third surface, and the fourth surface,
the first surface is inclined downward as going away from the side part,
the second surface and the fourth surface are inclined upward as going away from the side part, and
an inclination angle θ22 of the second surface is greater than an inclination angle θ23 of the third surface, and an inclination angle θ24 of the fourth surface is greater than the inclination angle θ22 of the second surface.

3. The insert according to claim 2, wherein
the upper surface comprises
a first area including the third corner surface and the fourth corner surface, and
a second area including the third surface and the fourth surface, and
the side region further comprises a fifth surface located between the first area and the second area, and inclined downward as going away from the first area.

4. The insert according to claim 2 or 3, wherein
the side region is located at each of both sides of the corner region.

5. The insert according to claim 2, wherein
an upper end of the second corner surface is located lower than an upper end of the second surface.

6. The insert according to claim 2, wherein
an upper end of the third corner surface is located above an upper end of the third surface.

7. The insert according to claim 2, wherein
the inclination angle θ13 of the third corner surface is greater than the inclination angle θ23 of the third surface.

8. The insert according to claim 2, wherein
a height of an upper end of the fourth corner surface is equal to a height of an upper end of the fourth surface.

9. The insert according to claim 1, wherein
a width of the third corner surface increases as going away from the corner part in a top view.

10. The insert according to claim 9, wherein
a width of the fourth corner surface decreases as going away from the corner part in a top view.

11. The insert according to claim 2, wherein
the inclination angle θ12 of the second corner surface is greater than the inclination angle θ22 of the second surface.

12. The insert according to claim 2, wherein
each of an inclination angle θ21 of the first surface, the inclination angle θ22 of the second surface, and the inclination angle θ24 of the fourth surface is constant along the side part.

13. The insert according to claim 2, wherein
a difference between the inclination angle θ12 of the second corner surface and the inclination angle θ14 of the fourth corner surface is smaller than a difference between the inclination angle θ22 of the second surface and the inclination angle θ24 of the fourth surface.

14. The insert according to claim 2, wherein
the inclination angle θ12 of the second corner surface is greater than the inclination angle θ22 of the second surface.

15. The insert according to claim 2, wherein
the inclination angle θ13 of the third corner surface is greater than the inclination angle θ23 of the third surface and is smaller than each of the inclination angle θ22 of the second surface and the inclination angle θ24 of the fourth surface.

16. A cutting tool, comprising:
a holder comprising a pocket at a side of a front end of the holder; and
   an insert according to claim 1 which is located at the pocket in the holder.

17. A method of manufacturing a machined product, comprising:
rotating a workpiece;
bringing a cutting tool according to claim 16 into contact with the workpiece being rotated; and
moving the cutting tool away from the workpiece.

* * * * *

UNITED STATES PATENT AND TRADEMARK OFFICE
CERTIFICATE OF CORRECTION

| | |
|---|---|
| PATENT NO. | : 10,583,501 B2 |
| APPLICATION NO. | : 16/075188 |
| DATED | : March 10, 2020 |
| INVENTOR(S) | : Yoshihito Ikeda |

Page 1 of 1

It is certified that error appears in the above-identified patent and that said Letters Patent is hereby corrected as shown below:

On the Title Page

The title and in the Specification at Column 1, Lines 1-3, change "INSERT, CUTTING TOOL, AND METHOD FOR MANUFACTURING CUTTING WORKPIECE" to -- INSERT, CUTTING TOOL, AND METHOD OF MANUFACTURING MACHINED PRODUCT --.

Signed and Sealed this
First Day of September, 2020

Andrei Iancu
*Director of the United States Patent and Trademark Office*